April 19, 1932.  H. LUNDQUIST  1,854,266
LIQUID LEVEL INDICATOR
Filed Feb. 23, 1922
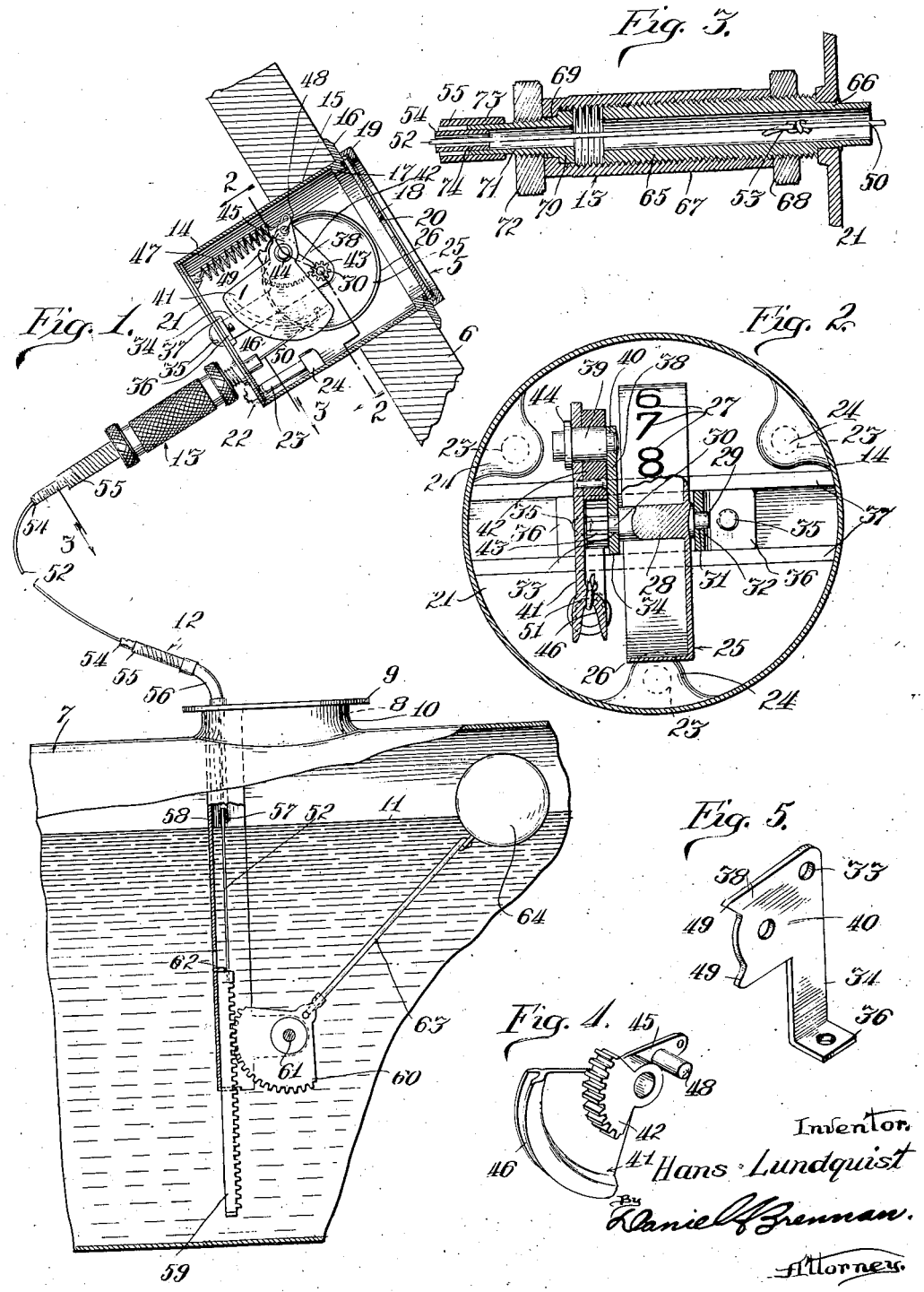
Inventor.
Hans Lundquist
By Daniel F Brennan.
Attorney.

Patented Apr. 19, 1932

1,854,266

UNITED STATES PATENT OFFICE

HANS LUNDQUIST, OF CHICAGO, ILLINOIS, ASSIGNOR TO UNITED STATES SPECIALTY CORPORATION, A CORPORATION OF ILLINOIS

LIQUID LEVEL INDICATOR

Application filed February 23, 1922. Serial No. 538,784.

This invention relates to liquid level indicators, and more particularly pertains to an improved indicator for use on motor vehicles for indicating the level of liquid fuel in the main supply tank.

While this invention, for the purposes of convenience, is illustrated as a fuel level indicator, and is described as such, it will be obvious that it finds a wide field of utility for other purposes.

The principal objects and advantages which characterize this invention are: The provision of improved means for accurately indicating at a convenient point the level of liquid in a tank situated at a more remote point; the provision of means for insuring accurate response to material changes in liquid level, but which does not readily respond to changes due to vibration; the provision of improved means whereby an indicator of the character referred to may be readily adjusted to proper calibration upon installation in order to assure accuracy; the provision of means for balancing the indicator to provide for smooth and even operation; the provision of a device of the character described which is of an improved unit construction and may be readily installed on any standard fuel tank; and the provision of a device of the character referred to which is simple and compact, efficient in operation, and capable of manufacture at low cost.

It is further an object of this invention to provide an improved level indicating mechanism comprising, in its preferred embodiment, a revolving indicator element and a yieldingly resistant element and weight for balancing said indicator, so that its operation by the fluid level actuated means will be even and well balanced.

The foregoing and such other objects and advantages as may be pointed out or appear as this description proceeds are attained in the embodiment illustrated in the accompanying drawings, in which:

Figure 1 is a view, partly in section and partly in elevation, showing the device of this invention assembled for operation.

Figure 2 is an enlarged transverse sectional view taken on line 2—2 of Figure 1, looking in the direction indicated by the arrows.

Figure 3 is an enlarged longitudinal sectional view of a detail taken on line 3—3 of Figure 1, looking in the direction indicated by the arrows.

Figures 4 and 5 are enlarged perspective views of details.

Referring more particularly to the drawings, the indicator is designated 5 in its entirety and is mounted on the inclined portion 6 of the dash (not shown). A fuel supply tank 7 is provided with an opening 8 by which the tank may be filled with liquid fuel, and a cap 9 fits on a flange 10 about said opening, said cap carrying the liquid level actuated device, designated 11 in its entirety. Motion transmission means generally designated 12 serves to operatively connect the indicator and level actuated mechanism, an adjusting element generally designated 13 being placed in said transmission means.

The indicator, as shown in Figs. 1 and 2, comprises a cylindrical casing 14, placed in an opening 15 in the portion 6, and provided at one end with an external annular flange 16, by which said casing may be fixedly secured. The front end of the casing 14 is provided with an internal annular flange 17, on which is peripherally seated a closing disk 18, retained by a clamping ring 19, said disk having a rectangular central opening 20 through which the indicator element may be seen. The rear wall 21 of the casing is removable and it is upon this wall that the indicating mechanism is supported in its entirety. This rear wall 21 is removably secured by nuts 22 which thread onto the exposed ends of bolts 23 which pass through the wall 21, near its periphery, said bolts being fixedly mounted in lugs 24, formed on the inner surface of the peripheral wall of the casing.

The indicating mechanism preferably comprises a revoluble drum 25, having a cylindrical flange 26, on the external face of which are placed numerals 27 in proper sequence. The drum 25 is provided with an integral axial shaft 28, from the ends of which project integral trunnions 29 and 30, the trunnion 29 being revoluble in a bearing opening 31 in a bracket 32, and the trunnion 30 being similarly mounted in a bearing opening 33 in a bracket 34. The brackets 32 and 34 are secured in spaced relation to the wall 21, by screws 35, the base portions 36—36 of said brackets being disposed between spaced transverse ribs 37—37 on the wall 21, thus preventing the brackets from rotating about their fastening screws.

The bracket 34 is provided with a lateral extension 38, in the same plane with the bracket, said extension having a stub shaft 39 affixed in an opening 40 near the outer end of said extension. A segmental pulley 41 is oscillatable upon the shaft 39, and said pulley carries with it a segmental gear 42, which meshes with a pinion 43 fixedly mounted upon the projecting end of the trunnion 30, the pulley being sufficiently spaced from the bracket 34 to permit of accommodation of the gear and pinion. The outer end of the shaft 39 is provided with an enlargement 44 for preventing displacement of the pulley.

The pulley 41 is provided with a radial extension 45 opposite to the groove 46 of the pulley, and a contractile helical spring 47 has one end attached to said extension and the other end affixed to the wall 21. As shown in Figs. 1 and 4, the extension 45 carries a laterally inwardly projecting pin 48 for engagement with one or the other of a pair of seats 49 on the end of the extension 38, for confining the movement of the pulley within certain limits. A short length of cable 50 is fixed at 51 on the pulley and said cable is adapted to line in the groove of the pulley.

Motion is imparted to the pulley through a flexible cable 52, detachably connected at 53 with the short length of cable 50, said cable 52 preferably being of relatively stiff yet flexible wire and lying fairly snugly in a flexible transmission tube 54 of coiled wire, which tube 54 is provided with a fluid tight protective jacket 55. The tube 54 and jacket 55 are fixedly connected to an elbow 56, which latter is secured in the top of the cap 9, a short tube 57 depending from the cap for guiding the wire 52.

The liquid level actuated mechanism comprises a channel guide 58, depending from the cap 9, said channel supporting and retaining a rack-bar 59 for vertical sliding movement, the upper end of said rack being connected to the wire 52. The rack bar is retained against displacement by a segmental gear 60 which meshes with the rack, and is revolubly mounted in a bearing 61 formed integrally with the channel guide, lugs 62, one on each side of the rack-bar and struck from the channel guide, also serving for assisting in retention of the rack. An arm 63 extends radially from the segmental gear 60 and a float 64 is mounted pivotally on the free end of said arm. The provision of the pivot for the float insures accurate indication of the liquid level, because the float, being somewhat elongated and lying transversely of the arm 63, will therefore maintain an even horizontal disposition on the surface of the liquid. It will be readily seen that upon material variations in the liquid level in the tank 7, the float will rise or fall, and thus impart, through the cable 52, an oscillating movement to the pulley 41, and in turn a rotary movement to the indicator drum 25, the indicia on the drum flange being exposed to view through the opening 20 in the casing wall 18. The weight of the pulley and the spring 47 cooperate to counter-balance the device, and prevent undue vibration, as well as insuring the accurate response of the same to changes in liquid level.

I have provided means for varying the stroke of the transmission element, or in other words, for altering the calibration of the indicator, and consequently its position relative to the float, when the device has been installed, so that the extremities of movement of the indicator drum will agree with those of the float, as variable due to different sizes of tanks or other conditions. This adjusting device accomplishes this result through predetermined limits by varying, in effect, the length of the transmission tubing 54 and jacket 55.

It will be observed that in the provision of the above mentioned adjusting means and its connection to the housing for the indicator, and in the connection of the device to the tank, the whole indicator and its associated mechanism, the communicating means, and the connections thereof are rendered substantially air-tight. That is, no gasoline fumes are allowed to escape from the tank to the interior of the automobile via the indicator. The wire transmitting member 52 fits quite snugly in the casing and will in itself, tend to prevent the escape of fumes and the fact that a glass is placed over the front of the indicator housing will prevent any fumes reaching the interior of the automobile.

The element for performing the function of adjustment of the transmission element preferably comprises a tube 65, relatively large in diameter, and having one end reduced at 66 and swaged into an opening in the rear wall 21 of the casing 14. The cable 50 enters the tube 65 and is connected, as previously described, with the cable 52. The tube 65 is externally threaded to receive an internally threaded sleeve 67, which is adjustable on said tube, the end of said sleeve near the wall 21, abutting a lock nut 68. The outer end of the sleeve 65 is provided with an internal annular shoulder 69 which abuts an annular head 70 formed on the inner end of a nipple 71, said nipple being externally threaded to receive a lock nut 72, which latter abuts the outer end of the sleeve 67. The jacket 55 is fixedly secured externally to the free end of the nipple, as at 73, and the transmission tubing 54 is fixedly secured internally, at 74, to said nipple. The jacket and tubing are secured in any suitable manner, such as by a press fit.

Adjustment of the sleeve 67 will move the jacket and tubing toward or away from the wall 21 and consequently decrease or increase the length of the tubing and thereby impart rotation to the indicator member 26. This change in the position of the indicator permits of the final adjustment of the indicator with respect to the float, so that the position of the latter and that of the indicator may be made to coincide for rendering a proper signal. The nuts 68 and 72 are loosened away from the sleeve, and the latter turned until the desired adjustment is made, whereupon the nuts 68 and 72 are again tightened and the adjustment sustained. The link connection 53 permits of disconnection of the cable 52 when it is desired to pack and ship the device. The adjustment described is ordinarily made, of course, while installing this invention, but may be made at any time desired, such as in the event that the cable becomes stretched, or any other cause may effect a change in the length of the cable. Thus adjustment is had without interruption of the continuity of the cable 52, and without disassembly of any of the parts of the device.

While a specific embodiment of this invention has been illustrated, it will be understood that minor alterations in the details may be made within the spirit of this invention and scope of the claims.

I claim:

1. In a device of the character described, in combination, a liquid level indicating mechanism including a revolving indicator element, a balance weight angularly displaceable on a separate axis and connected to said indicator element, spring means acting on said weight and a float actuated element for operating said indicating mechanism.

2. In a device of the character described, in combination, a fluid level indicating mechanism comprising a revolving indicator element and a weight operatively connected thereto, a float actuated element adjustably operatively connected with said mechanism, and yieldingly resistant means connected with and tending to restrain movement of said weight in one direction.

3. In a device of the character described, in combination, a tank adapted to contain liquid to a predetermined level, float mechanism in said tank, an indicator remote from said tank, a continuous motion transmission means fixedly connected to said float mechanism and indicator, and means for varying the distance between said mechanism and indicator for moving the latter without disturbing the continuity or length of said motion transmission means and means in engagement with the means for varying the distance for locking said means and thereby holding said float mechanism and indicator in predetermined adjustment.

4. In a device of the character described, in combination, a liquid level indicating mechanism including a revolving indicator element, a balance weight angularly displaceable on a separate axis and connected to said indicator element, and a float actuated element connected directly to said weight for operating said indicating mechanism.

5. In a liquid level indicator, a revolving indicating element, an oscillating element independent of said indicating element and for actuating the latter and a spring restrained counterbalancing weight mounted directly upon said oscillating element.

6. In a device of the character described, in combination, a tank adapted to contain liquid to a predetermined level, level responsive means in said tank, an indicator remote from the tank and comprising a revolving element, an oscillatable element operatively connected to said revolving element, and also connected to said level responsive means, and means for varying the latter connection.

7. In a device of the character described, in combination, a tank adapted to contain liquid to a predetermined level, level responsive means in said tank, an indicator remote from the tank and comprising a revolving element, an oscillatable element operatively connected to said revolving element, a flexible cable connecting said oscillatable element and level responsive means, a conduit for said cable, and means for varying the length of said conduit.

8. In an indicator, a revoluble element carrying sequential indicia, an oscillating weight operatively connected with said revoluble element, and yieldingly resistant means connected with said oscillating weight.

9. In a device of the character described, in combination, an indicating mechanism, comprising a revolving indicator, a weight connected to said indicator for normally tending to maintain said indicator in a predetermined position, a liquid level actuated means operatively connected with said mechanism, and yieldingly resistant means connected with and tending to restrain movement of said weight.

10. In a device of the character described in combination, an indicating mechanism, comprising a revolving indicator and a balance weight for normally tending to maintain said indicator in a predetermined position, liquid level responsive means, motion transmitting means operatively connecting said mechanism and liquid level responsive means, a conduit for said motion transmitting means, and means for varying the length of said conduit.

11. In a device of the character described, in combination, a revolving indicator, an actuating element, a cable positively connecting said indicator and actuating element, means for maintaining said cable under tension including a weight acting on said indicator and in a direction with said actuating element and a spring acting on said indicator in a direction counter to said actuating element.

12. In a device of the character described, in combination, a revolving indicator, an actuating element, a cable positively connecting said indicator and actuating element, means for maintaining said cable under tension including a weight acting on said indicator and in a direction with said actuating element and a spring connected to said weight and acting on said indicator in a direction counter to said actuating element.

13. In a device of the character described, in combination, a revolving indicator, an actuating element, a cable positively connecting said indicator and actuating element, means for maintaining said cable under tension including a weight acting on said indicator and in a direction with said actuating element and a spring acting on said indicator in a direction counter to said actuating element, and means for varying the initial position of said indicator.

14. In a device of the character described, in combination, a revolving indicator, an actuating element, a cable positively connecting said indicator, and actuating element, means for maintaining said cable under tension including a weight acting on said indicator to increase the reading thereof and in a direction with said actuating element and a spring acting on said indicator to decrease the reading thereof and in a direction counter to said actuating element, the force exerted by said spring tending to exceed that exerted by the weight so as to render a zero reading if said cable or actuating element are disconnected.

15. In combination, an indicator consisting of a revoluble member for indicating given quantities, an actuator, and connecting means therebetween, said connecting means including a flexible member, means for maintaining said flexible member under tension, a casing therefor, and means for varying the relative lengths of the connecting means and casing between the indicator and actuator whereby perfect registration is obtained on the indicator.

16. In combination, an actuator, an indicator, a communicating means between said actuator and indicator and including a flexible member, means for maintaining said flexible member taut, means to protect the communicating means between the actuator and the indicator, and means to adjust the relative lengths of the communicating means and the protecting covering therefor to effect the adjustment of the indicator.

17. In combination, an indicator and an actuator a yielding flexible connecting means therebetween, comprising a single flexible member and a flexible spiral casing, the first mentioned member being adapted to pass freely within said casing, a second spiral flexible casing surrounding the first mentioned casing, and adapted to be clamped thereto and means mounted adjacent to and acting on the indicator to maintain the flexible member taut.

18. In combination with an indicator, a float, and an actuating cable connecting said float and indicator, of a conduit inclosing said cable, and means for adjusting said conduit comprising nipples connected, respectively, to said indicator and conduit, a sleeve having connection with one of said nipples, and a lock nut forming connection between said sleeve and the other of said nipples.

In testimony whereof I affix my signature.

HANS LUNDQUIST.